(12) United States Patent
Fan et al.

(10) Patent No.: US 12,529,308 B2
(45) Date of Patent: Jan. 20, 2026

(54) ROCK POROSITY PREDICTION METHOD BASED ON SMALL-SAMPLE INVERSION OF WHILE-DRILLING DATA

(71) Applicant: China University of Mining and Technology, Xuzhou (CN)

(72) Inventors: Gangwei Fan, Xuzhou (CN); Tao Luo, Xuzhou (CN); Dongsheng Zhang, Xuzhou (CN); Shizhong Zhang, Xuzhou (CN); Zhanglei Fan, Xuzhou (CN); Huining Ni, Xuzhou (CN); Zihan Kong, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 0 days.

(21) Appl. No.: 19/266,270

(22) Filed: Jul. 11, 2025

(65) Prior Publication Data

US 2025/0369353 A1 Dec. 4, 2025

Related U.S. Application Data

(63) Continuation of application No. PCT/CN2025/093331, filed on May 8, 2025.

(30) Foreign Application Priority Data

May 31, 2024 (CN) .................. 202410696914.X

(51) Int. Cl.
*E21B 49/00* (2006.01)
*G01V 99/00* (2024.01)

(52) U.S. Cl.
CPC ............ *E21B 49/003* (2013.01); *G01V 99/00* (2013.01); *E21B 2200/22* (2020.05)

(58) Field of Classification Search
None
See application file for complete search history.

(56) References Cited

U.S. PATENT DOCUMENTS 11,630,228 B1    4/2023   Fu
2018/0347354 A1* 12/2018  Li ........................... G06N 20/00
(Continued)

FOREIGN PATENT DOCUMENTS

CN      101575970 A    11/2009
CN      106556863 A     4/2017
(Continued)

OTHER PUBLICATIONS

Chen, L., Lin, W., Chen, P. et al. Porosity Prediction from Well Logs Using Back Propagation Neural Network Optimized by Genetic Algorithm in One Heterogeneous Oil Reservoirs of Ordos Basin, China. J. Earth Sci. 32, 828â838 (2021). https://doi.org/10.1007/s12583-020-1396-5 (Year: 2021).*

(Continued)

*Primary Examiner* — Lina Cordero
(74) *Attorney, Agent, or Firm* — Cooper Legal Group, LLC

(57) ABSTRACT

A rock porosity prediction method based on small-sample while-drilling data inversion is provided, including: collecting while-drilling parameters during laboratory or field drilling processes, including parameters such as torque M, propulsion F, rotational speed N, drilling speed V, drill pipe amplitude A, and vibration acceleration a; inputting the different types of multi-stage denoised while-drilling parameter data into a backpropagation regression-genetic algorithm (BP-GA) model for discrete point elimination, data augmentation, and iterative calculation to form a new while-drilling dataset; inputting the time-frequency domain feature graphs of while-drilling parameters for rocks with different porosities into a rock porosity convolutional neural network (Continued)

(VG-CNN) prediction model, obtaining an inversion model between the time-frequency domain features of while-drilling parameters and porosity through training and learning, ultimately achieving inversion prediction of rock porosity according to real-time field while-drilling parameters.

3 Claims, 2 Drawing Sheets

(56) References Cited

U.S. PATENT DOCUMENTS

| | | | | |
|---|---|---|---|---|
| 2021/0293139 | A1* | 9/2021 | Kharaa | ............ G01V 5/10 |
| 2023/0125398 | A1* | 4/2023 | Abdelaal | ............ E21B 45/00 |
| | | | | 175/24 |

FOREIGN PATENT DOCUMENTS

| | | |
|---|---|---|
| CN | 114397711 A | 4/2022 |
| CN | 114492521 A | 5/2022 |
| CN | 115059448 A | 9/2022 |
| CN | 116822328 A | 9/2023 |
| CN | 116957363 A | 10/2023 |
| CN | 117350145 A | 1/2024 |
| CN | 117973191 A | 5/2024 |
| CN | 118568629 A | 8/2024 |

OTHER PUBLICATIONS

CN114397711A translation (Year: 2022).*
Notice of first Office action dated Oct. 12, 2024 in SIPO application No. CN202410696914.X, 7 pages.
Retrieval report—First search dated Oct. 8, 2024 in SIPO application No. CN202410696914.X, 6 pages.
Notification to Grant Patent Right for Invention dated Oct. 24, 2024 in SIPO application No. CN202410696914.X, 3 pages.
Retrieval report—Supplementary search dated Oct. 17, 2024 in SIPO application No. CN202410696914.X, 4 pages.
Jian Sun, "Identification of Porosity and Permeability While Drilling Based on Machine Learning", Arabian Journal for Science and Engineering, Feb. 23, 2021, 15 pages.
Xu Fulin, "Research on the Coal-rock Property Recognition Method During Drilling Process of the Drilling Robot for Rockburst Prevention", Chinese Master's Theses Full-text Database (Engineering and Technology Series I), Apr. 15, 2024, English abstract on pp. 4-5, 95 pages.
International Search Report issued in corresponding PCT Application No. PCT/CN2025/093331 dated Jul. 23, 2025, 7 pages.

* cited by examiner

ROCK POROSITY PREDICTION METHOD BASED ON SMALL-SAMPLE INVERSION OF WHILE-DRILLING DATA

CROSS-REFERENCE TO RELATED APPLICATIONS

This application is a continuation of International Patent Application No. PCT/CN2025/093331, filed May 8, 2025 and claims priority of Chinese Patent Application No. 202410696914.X, filed on May 31, 2024. The entire contents of International Patent Application No. PCT/CN2025/093331 and Chinese Patent Application No. 202410696914.X are incorporated herein by reference.

TECHNICAL FIELD

The present disclosure relates to a method for predicting rock porosity inversion in underground engineering, specifically relates to a rock porosity prediction method based on small-sample while-drilling data inversion.

BACKGROUND

Porosity is an important indicator for characterizing physical and mechanical parameters of rocks, such as strength, elastic modulus, and permeability. Rapid determination of rock porosity in underground roadway engineering is of great significance for selecting support methods and determining support parameters. Traditional methods for measuring rock porosity require processing cored rocks into test samples and conducting laboratory testing and analysis. In fields such as petroleum drilling, logging information may be analyzed to finely characterize and quantitatively invert the porosity of oil and gas reservoirs. However, for shallow underground engineering projects (e.g., subways, tunnels, and underground roadways), conducting well logging and mud logging is economically costly and operationally cumbersome. Therefore, there is a need to propose a quantitative, rapid, and economical in-situ method for measuring rock porosity.

Currently, while-drilling measurement technology has gradually become a hotspot in the field of intelligent geotechnical exploration. While-drilling measurement technology may use the variation characteristics of while-drilling parameters during the drilling process to reflect the mechanical properties of surrounding rocks and identify formation lithology and structural features. This technology may effectively compensate for the time lag of traditional measurement methods and does not interfere with field construction, making it a convenient and rapid in-situ measurement method. Related research achievements in the field of while-drilling testing have preliminarily verified the feasibility of inverting rock strength and identifying rock mass structural planes based on while-drilling parameters. However, due to the complexity of the interaction process between the drill bit and rock, as well as characteristics of limited effective data and susceptibility to external environmental interference during field data collection, it is difficult to invert and predict rock porosity using while-drilling parameters. Existing literature rarely reports methods for inverting and predicting the porosity of surrounding rocks in roadways, and there are no relevant reports on how to use small-sample while-drilling data for precise inversion prediction of rock porosity. Therefore, it is necessary to establish a scientific and reasonable while-drilling inversion prediction method for rock porosity.

SUMMARY

To address the above technical shortcomings, the objective of the present disclosure is to provide a rock porosity prediction method based on small-sample while-drilling data inversion, which may utilize small-sample while-drilling data obtained during laboratory or field drilling processes to achieve rapid and quantitative inversion prediction of rock porosity.

To solve the above technical problems, the present disclosure adopts the following technical solutions:

The present disclosure provides a rock porosity prediction method based on small-sample while-drilling data inversion, including the following steps:

step S1: collecting while-drilling information during a drilling process of a drill rig in a laboratory or an underground roadway, and obtaining key while-drilling parameters of torque M, propulsion F, rotational speed N, penetration rate V, drill pipe amplitude A, and vibration acceleration a;

step S2: performing multi-stage denoising processing on collected different types of while-drilling parameters, and inputting multi-stage denoised while-drilling parameter values into a backpropagation regression-genetic algorithm "BP-GA" model to obtain a new derived while-drilling parameter dataset;

step S3: analyzing variation curves of the different types of while-drilling parameters with drilling time t within the new while-drilling parameter dataset to obtain time-frequency domain graphs of the while-drilling parameters, and using a data augmentation function in a neural network to obtain a time-frequency domain image library of the different types of while-drilling parameters; and step S4: constructing a rock porosity convolutional neural network prediction model, training and learning the time-frequency domain feature image library of the while-drilling parameters during a drilling process of rocks with different porosities, determining an initial learning rate and a decay coefficient of the model, and obtaining rock porosity prediction results.

Optionally, an implementation process of a multi-stage denoising method for the different types of while-drilling parameters in the step S2 includes following steps:

step 1.1: based on original data of continuously collected different types of while-drilling parameters, calculating extreme points $m_i$, mean values $n_j$, and local amplitudes $a_i$ for each type of while-drilling parameter;

$$n_j = \frac{m_i + m_{i+1}}{2} \tag{1}$$

$$a_i = \frac{|m_i - m_{i+1}|}{2}; \tag{2}$$

using a local mean function a(t) to separate original while-drilling data x(t), and then using an envelope estimation function m(t) to demodulate the original while-drilling data x(t):

$$h(t) = x(t) - a(t) \tag{3}$$

$$s(t) = \frac{h(t)}{m(t)}; \tag{4}$$

repeating above operations until the original while-drilling data x(t) is reduced to a monotonic function or has ≤3 extreme points, then stopping iterative calculation, where at this point, the original while-drilling data x(t) is decomposed into k decision components PF and one decomposition residue;

step 1.2: using kurtosis $H_1$, correlation coefficient $H_2$, and root mean square value $H_3$ as selection criteria for the PF components, where an evaluation metric $V_{ij}$ for the PF components is expressed as:

$$V_{ij} = \frac{H_{ij}}{\sum_{i=1}^{k} H_{ij}}, \quad (5)$$

where j takes values of 1, 2, 3, . . . , k;
where PF components with $V_{ij}$>90% are defined as valid components;

step 1.3: using a wavelet denoising method to further denoise screened PF components, including performing wavelet denoising on the valid PF components of the torque M, the propulsion F, the rotational speed N, the penetration rate V, the drill pipe amplitude A, and the vibration acceleration a, where a wavelet denoising function used for the torque and the rotational speed is a db3 wavelet denoising function, a wavelet denoising function used for the propulsion and the penetration rate is a coif3 wavelet denoising function, and a wavelet denoising function used for the drill pipe amplitude and the vibration acceleration is a biore3.3 wavelet denoising function; and step 1.4: inputting multi-stage denoised while-drilling parameter data into the "BP-GA" model for iteration, crossover, and mutation to achieve data augmentation and data derivation.

Optionally, in the step S2, the "BP-GA" model is established to address an issue of a small amount of time-frequency domain graph sample data caused by difficulties in field data collection for the six types of while-drilling parameters, and a specific method is:

step 2.1: using a back propagation (BP) neural network to determine collected while-drilling information samples and expected output values, and using an adaptive algorithm to determine initial weights and thresholds of the BP neural network corresponding to each type of while-drilling parameter, thereby eliminating unreasonable data;

step 2.2: for the six types of while-drilling parameters after eliminating the unreasonable data, using a genetic algorithm for iteration, crossover, and data mutation, with a crossover probability of 0.75 and a mutation coefficient of 0.031, where newly generated while-drilling parameter data groups after encoding are $M_1$, $M_2$, . . . , $M_6$, respectively;

step 2.3: establishing relationship curves between newly generated while-drilling parameter data and drilling time t, and then obtaining time-frequency domain feature graphs of the different types of while-drilling parameters; and step 2.4: using the data augmentation function in the neural network to perform operations of random flipping, clockwise or counterclockwise rotation, brightness change, and pixel value enhancement on time-frequency domain feature graphs of each type of while-drilling parameter, expanding the time-frequency domain image library of the while-drilling parameters, and stopping the iterative calculation of the neural network when a number of time-frequency domain feature images corresponding to each type of while-drilling parameter are ≥1200.

Optionally, in the step S3, a method for obtaining the time-frequency domain feature graphs of the different types of while-drilling parameters includes following steps:

step 3.1: based on while-drilling information processed by multi-stage denoising and the "BP-GA" model, establishing the variation curves of the different types of while-drilling parameters with the drilling time t to obtain time-domain feature graphs of the while-drilling parameters;

step 3.2: using discrete Fourier transform to convert the time-domain feature graphs of the while-drilling parameters into the frequency-domain feature graphs, where a transformation equation is:

$$Y(n) = \sum_{t=0}^{L-1} y(t)\exp(-2j\pi nt/L), \quad (6)$$

where Y(n) represents a finite-length discrete frequency sequence of a length L, n=0, 1, . . . , L−1, Hz, and y(t) represents a discrete time sequence of a duration T; and step 3.3: using short-time Fourier transform to fuse the time-domain graphs and the frequency-domain graphs of the while-drilling parameters; namely, taking time as a horizontal axis and sampling frequency and instantaneous energy changes of the while-drilling parameters as a vertical axis, obtaining the time-frequency domain feature images of the different types of while-drilling parameters, and inputting expanded time-frequency domain image library of the while-drilling parameters into the rock porosity convolutional neural network prediction model, namely a rock porosity convolutional neural network (VG-CNN) prediction model.

Optionally, in the step S4, a specific prediction process of the rock porosity convolutional neural network prediction model is as follows:

step 4.1: firstly, inputting the time-frequency domain feature graphs of while-drilling information of the rocks with different porosities into a first convolutional layer of the VG-CNN prediction model, where the convolutional layer consists of 42 convolution kernels with a size of 3×3;

step 4.2: next, inputting feature graphs from the first convolutional layer into a first pooling layer of the VG-CNN prediction model, where the pooling layer consists of a 2×2 pooling window; and step 4.3: repeating the step 4.1 and the step 4.2 until a learning rate of the VG-CNN prediction model is ≤3×10$^{-5}$ and the decay coefficient is ≤3×10$^{-6}$, then stopping model training; at this point, substituting rock porosity prediction confusion matrix data into a following equation to verify a prediction accuracy of the VG-CNN prediction model for rock porosity:

$$A = \frac{P_T + N_T}{P_T + N_T + P_F + N_F}(7), \quad (7)$$

where $P_T$ represents true positives, $N_T$ represents true negatives, $P_F$ represents false positives, and $N_F$ represents false negatives.

The beneficial effects of the present disclosure are as follows:

In this method, limited real-time while-drilling parameter data is obtained during the drilling process, and subjected to iterative derivation through a "neural network+genetic algorithm" after multi-stage denoising. The newly formed while-drilling dataset features a large volume of data, high reliability, and strong robustness, effectively addressing the technical challenges of significant external interference, small effective data volume, and strong data discreteness in the field data collection process of while-drilling experiments.

The while-drilling parameters selected in this method are reasonable and scientific, capable of truly reflecting rock porosity. By optimizing the structural parameters of the convolutional neural network, the inversion accuracy of rock porosity is improved. This method resolves the lag caused by traditional quantitative evaluation of rock porosity, which requires laboratory testing, and may be applied to predict and evaluate the porosity of surrounding rock in underground engineering projects such as coal mine tunnels, subways, and tunnels, where geological conditions are variable and space is limited.

BRIEF DESCRIPTION OF THE DRAWINGS

In order to explain the embodiments of the present disclosure or the technical solution in the prior art more clearly, the following will briefly introduce the drawings required for describing the embodiments or the prior art. Apparently, the drawings in the following description are only some embodiments of the present disclosure. For one of ordinary skill in the art, other drawings may be obtained according to these drawings without creative effort.

DETAILED DESCRIPTION OF THE EMBODIMENTS

In the following, the technical solutions in the embodiments of the present disclosure will be clearly and completely described with reference to the attached drawings. Apparently, the described embodiments are only a part of the embodiments of the present disclosure, but not all the embodiments. Based on the embodiments in the present disclosure, all other embodiments obtained by one of ordinary skill in the art without creative effort belong to the protection scope of the present disclosure.

Figure 1:
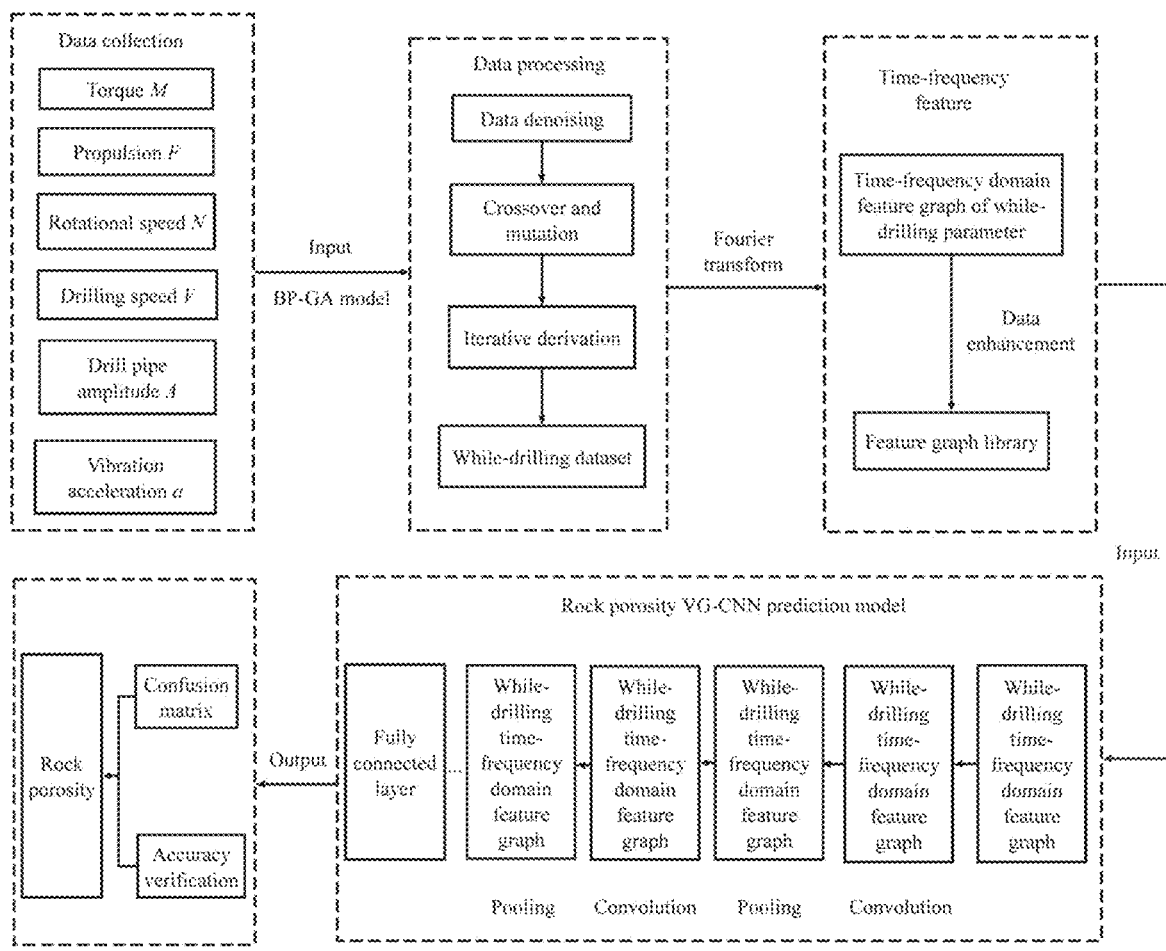
FIG. 1 is a schematic flowchart of a rock porosity prediction method based on small-sample while-drilling data inversion according to an embodiment of the present disclosure.

As shown in FIG. 1, a rock porosity prediction method based on small-sample while-drilling data inversion includes the following steps:

step S1: preparing rock specimens including sandstone, mudstone, limestone, granite, and marble, each processed into cubic samples of 15 centimeters×15 centimeters×15 centimeters, and dividing the rock specimens into five groups according to lithology, each group comprising nine samples; performing a physical vertical drilling operation on each specimen using a drill rig, maintaining a constant feed rate of 60 millimeters per minute and a rotational speed of 200 revolutions per minute; controlling the drilling depth to a uniform 120 millimeters per specimen; automatically stopping drilling upon reaching the preset depth; and collecting real-time while-drilling parameters including torque (M), propulsion force (F), rotational speed (N), penetration rate (V), drill pipe amplitude (A), and vibration acceleration (a);

step S2: performing multi-stage denoising processing on collected different types of while-drilling parameters, and inputting multi-stage denoised while-drilling parameter values into a backpropagation regression-genetic algorithm "BP-GA" model to obtain a new while-drilling parameter dataset;

step S3: analyzing variation curves of the different types of while-drilling parameters with drilling time t within the while-drilling parameter dataset to obtain time-frequency domain graphs of the while-drilling parameters, and using a data augmentation function in a neural network to obtain a time-frequency domain image library of the different types of while-drilling parameters; and step S4: constructing a rock porosity convolutional neural network (VG-CNN) prediction model, training and learning the time-frequency domain feature image library of the while-drilling parameters during a drilling process of rocks with different porosities, determining an initial learning rate and a decay coefficient of the model, and obtaining rock porosity prediction results.

A physical drilling is conducted using actual rock specimens to collect while-drilling data. Firstly, rocks with different porosities, such as sandstone, mudstone, limestone, granite, and marble, are processed into cubic specimens of 15 centimeters (cm)×15 cm×15 cm. The rocks are divided into 5 groups according to lithology, with 9 rock samples in each group, totaling 45 pieces. The while-drilling test experiment adopts the control variable method, i.e., maintaining constant drilling speed V and rotational speed N during the drilling process, while monitoring real-time data of other while-drilling parameters. The drilling speed is set to 60 millimeters per minute (mm/min), the drill bit rotational speed is set to 200 revolutions per minute (r/min), and the drilling depth is uniformly preset to 120 millimeters (mm). Upon reaching the predetermined drilling depth, the while-drilling experimental device automatically stops drilling.

Firstly, using the multi-stage denoising method proposed in the present disclosure, the while-drilling parameters such as torque M, propulsion F, rotational speed N, drilling speed V, drill pipe amplitude A, and vibration acceleration a collected by the sensors are subjected to denoising processing. Since the drilling speed V and rotational speed N are kept constant during the experiment, the focus is on denoising for torque M, propulsion F, drill pipe amplitude A, and vibration acceleration a. The wavelet denoising function used for the torque M is a db3 wavelet denoising function, the wavelet denoising function used for the propulsion is a coif3 wavelet denoising function, and the wavelet denoising function used for the drill pipe amplitude A and vibration acceleration a is a biore3.3 wavelet denoising function. A real-time multi-stage denoising process is applied using type-specific wavelet filters as db3 for torque M, coif3 for propulsion F, and biore3.3 for drill pipe amplitude A and vibration acceleration a until the original signal x(t) is reduced to a monotonic function or a function with three or fewer extrema, thereby improving the signal-to-noise ratio and enabling accurate downstream inversion and rock porosity prediction. The denoising stops until the original while-drilling data x(t) for each type is reduced to a monotonic function or has ≤3 extreme points. After denoising is completed, the datasets corresponding to each type of drilling parameter are labeled as $N_1, N_2, \ldots, N_6$, respectively. The system further comprises steps of detecting one or more anomalies in the parameters of the actual rock specimens in real time; detecting a drilling parameter pattern associated with the one or more anomalies in the parameters of the actual rock specimens in real time; dropping the one or more drilling operations or parameters corresponding to the respective detected anomalies in real time; and blocking future drilling control signals or parameter inputs associated with the detected anomalies.

Figure 2:
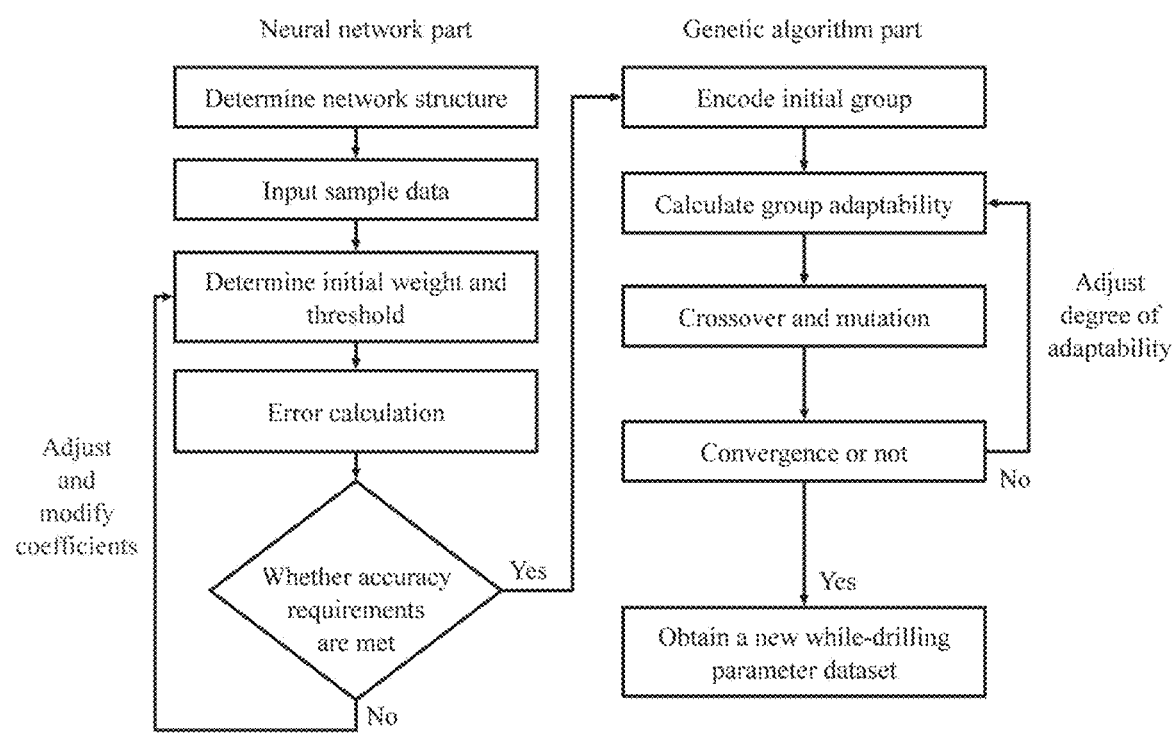
FIG. 2 is a structural diagram of a backpropagation regression-genetic algorithm (BP-GA) intelligent algorithm derivation model.

FIG. 2 shows the structure of the "BP-GA" intelligent algorithm derivation model. Based on the while-drilling test results, the initial weights and screening thresholds for the sample data are determined. For the same type of while-drilling parameters, data points with strong discreteness are proposed by calculating the range and average of the data. After eliminating unreasonable data, the six types of while-drilling parameters are subjected to iteration, crossover, and data mutation using a genetic algorithm, with a crossover probability of 0.75 and a mutation coefficient of 0.031. The newly generated while-drilling parameter data groups after encoding are $M_1, M_2, \ldots, M_6$, respectively.

Subsequently, relationship curves between newly generated while-drilling parameter data and drilling time t are established, and then time-frequency domain feature graphs of the different types of while-drilling parameters are obtained. The discrete Fourier transform is used to convert the time-domain feature graphs of the while-drilling parameters into frequency-domain feature graphs. Then, the short-time Fourier transform is used to fuse the time-domain graphs and the frequency-domain graphs of the while-drilling parameters, obtaining the time-frequency domain feature graphs of the different types of while-drilling parameters. The data augmentation function in the neural network is used to perform operations such as random flipping, clockwise or counterclockwise rotation, brightness change, and pixel value enhancement on the time-frequency domain feature images of each type of drilling parameter, and the time-frequency domain image library of the while-drilling parameters is expanded. The iterative calculation of the neural network stops when the number of time-frequency domain feature images corresponding to each type of while-drilling parameter are ≥1200.

Finally, the time-frequency domain feature images of while-drilling information of the rocks with different porosities are input into a first convolutional layer of a rock porosity VG-CNN prediction model, where the convolutional layer consists of 42 convolution kernels with a size of 3×3; the feature graphs from the first convolutional layer are input into a first pooling layer of the VG-CNN prediction model, where the pooling layer consists of a 2×2 pooling window; and the step 4.1 and the step 4.2 are repeated until a learning rate of the VG-CNN prediction model is $\leq 3\times10^{-5}$ and the decay coefficient is $\leq 3\times10^{-6}$, then model training is stopped. At this point, the optimal hyperparameters of the model are shown in Table 1:

TABLE 1

Optimal hyperparameters of rock porosity VG-CNN prediction model

| Learning decay rate | Initial learning rate | Decay coefficient | Processing speed/sheet | Training iterations |
|---|---|---|---|---|
| Stochastic gradient descent | $3 \times 10^{-5}$ | $1 \times 10^{-6}$ | 42 | 200 |

After the VG-CNN model training is completed, a new batch of coarse-grained sandstone is selected and processed into 15 cm×15 cm×15 cm cubic specimens for laboratory while-drilling tests. The drilling speed is set to 60 mm/min, the drill bit rotational speed is set to 200 r/min, and the drilling depth is uniformly preset to 120 mm. The real-time while-drilling parameters and time-frequency domain feature images collected in the laboratory are input into the VG-CNN prediction model, and the porosity of the coarse-grained sandstone is obtained to be 23.15% through inversion. Meanwhile, laboratory mercury intrusion tests are conducted to test the true porosity of the coarse-grained sandstone, and according to the test results, the porosity of coarse-grained sandstone is 25.37%. It may be seen that the rock porosity obtained through the inversion method according to the present disclosure is close to the true porosity measured in the laboratory. Through the present disclosure, the rock porosity may be accurately predicted based on the inversion of while-drilling parameters.

Apparently, one of ordinary skill in the art may make various modifications and variations to the present disclosure without departing from the spirit and scope of the present disclosure. Therefore, if these modifications and variations of the present disclosure fall within the scope of the claims of the present disclosure and their equivalent technologies, the present disclosure is also intended to cover these modifications and variations.

What is claimed is:

1. A rock porosity prediction method based on sample while-drilling data inversion, the rock porosity prediction method comprising:
   step S1: collecting while-drilling information by performing a drilling process using a drill rig in a laboratory or an underground roadway with a constant feed rate of 60 millimeters per minute and a rotational speed of 200 revolutions per minute, controlling a drilling depth to a uniform 120 millimeters, and stop the drilling process upon reaching the drilling depth, and obtaining different types of while-drilling parameters including torque M, propulsion F, rotational speed N, penetration rate V, drill pipe amplitude A, and vibration acceleration a;
   step S2: performing multi-stage denoising processing on the different types of while-drilling parameters, and inputting multi-stage denoised while-drilling parameter values into a backpropagation regression-genetic algorithm (BP-GA) model to obtain a new derived while-drilling parameter dataset;
   wherein an implementation process of a multi-stage denoising method for the different types of while-drilling parameters comprises:
   step 1.1: based on original data of the different types of while-drilling parameters, calculating extreme points $m_i$, mean values $n_i$, and local amplitudes $a_i$ for each type of while-drilling parameter;

$$n_i = \frac{m_i + m_{i+1}}{2} \tag{1}$$

$$a_i = \frac{|m_i - m_{i+1}|}{2}; \tag{2}$$

using a local mean function a(t) to separate original while-drilling data x(t), and using an envelope estimation function m(t) to demodulate the original while-drilling data x(t):

$$h(t) = x(t) - a(t) \tag{3}$$

$$s(t) = \frac{h(t)}{m(t)}; \tag{4}$$

repeating above operations in the step 1.1 until the original while-drilling data x(t) is reduced to a monotonic function or has ≤3 extreme points, and stopping iterative calculation, wherein the original while-drilling data x(t) is decomposed into k decision components PF and one decomposition residue;

step 1.2: using kurtosis $H_1$, correlation coefficient $H_2$, and root mean square value $H_3$ as selection criteria for the k decision components PF, wherein an evaluation metric $V_{ij}$ for the k decision components PF is expressed as:

$$V_{ij} = \frac{H_{ij}}{\sum_{i=1}^{k} H_{ij}}, \tag{5}$$

wherein j takes values of 1, 2, 3, . . . , k;
wherein the k decision components PF with $V_{ij}$>90% are defined as valid components;

step 1.3: using a wavelet denoising method to further denoise screened PF components, comprising performing wavelet denoising on the valid components of the torque M, the propulsion F, the rotational speed N, the penetration rate V, the drill pipe amplitude A, and the vibration acceleration a, wherein a wavelet denoising function used for the torque M and the rotational speed N is a Daubechies wavelet of order 3 (db3) wavelet denoising function, a wavelet denoising function used for the propulsion F and the penetration rate V is a Coiflet wavelet of order 3 (coif3) wavelet denoising function, and a wavelet denoising function used for the drill pipe amplitude A and the vibration acceleration a is a Biorthogonal wavelet of order 3 (biore3.3) wavelet denoising function; and step 1.4: inputting multi-stage denoised while-drilling parameter data into the BP-GA model for iteration, crossover, and mutation to achieve data augmentation and data derivation;

wherein a specific method for establishing the BP-GA model is:

step 2.1: using a back propagation (BP) neural network to determine while-drilling information samples and expected output values, and using an adaptive algorithm to determine initial weights and thresholds of the BP neural network corresponding to each type of while-drilling parameter, thereby eliminating unreasonable data;

step 2.2: for six types of while-drilling parameters after eliminating the unreasonable data, using a genetic algorithm for the iteration, the crossover, and the data mutation, wherein newly generated while-drilling parameter data groups after encoding are $M_1$, $M_2$, . . . , $M_6$, respectively;

step 2.3: establishing relationship curves between newly generated while-drilling parameter data and drilling time t, and obtaining time-frequency domain feature graphs of the different types of while-drilling parameters; and step 2.4: using a data augmentation function in a neural network to perform operations of random flipping, clockwise or counterclockwise rotation, brightness change, and pixel value enhancement on the time-frequency domain feature graphs of each type of while-drilling parameter, expanding a time-frequency domain image library of the different types of while-drilling parameters, and stopping the iterative calculation of the neural network when a number of the time-frequency domain feature graphs corresponding to each type of while-drilling parameter are ≥1200;

step S3: analyzing variation curves of the different types of while-drilling parameters with the drilling time t within the new derived while-drilling parameter dataset to obtain the time-frequency domain feature graphs of the different types of while-drilling parameters, and using the data augmentation function in the neural network to obtain the time-frequency domain image library of the different types of while-drilling parameters; and step S4: constructing a rock porosity convolutional neural network prediction model, training and learning the time-frequency domain image library of the different types of while-drilling parameters during a drilling process of rocks with different porosities, determining an initial learning rate and a decay coefficient of the rock porosity convolutional neural network prediction model, obtaining rock porosity prediction results, and based on the rock porosity convolutional neural network prediction model, detecting in real time one or more anomalies in the while-drilling parameters, dropping one or more drilling operations or parameters corresponding to the respective one or more anomalies, and blocking future drilling control signals or parameter inputs associated with the one or more anomalies.

2. The rock porosity prediction method based on sample while-drilling data inversion according to claim 1, wherein in the step S3, a method for obtaining the time-frequency domain feature graphs of the different types of while-drilling parameters comprises:

step 3.1: based on the while-drilling information processed by the multi-stage denoising processing and the BP-GA model, establishing the variation curves of the different types of while-drilling parameters with the drilling time t to obtain time-domain feature graphs of the different types of while-drilling parameters;

step 3.2: using discrete Fourier transform to convert the time-domain feature graphs of the different types of while-drilling parameters into frequency-domain feature graphs, wherein a transformation equation is:

$$Y(n) = \sum_{t=0}^{L-1} y(t)\exp(-2j\pi nt/L), \tag{6}$$

wherein Y(n) represents a finite-length discrete frequency sequence of a length L, n=0, 1, . . . , L−1, Hz, and y(t) represents a discrete time sequence of a duration T; and step 3.3: using short-time Fourier transform to fuse the time-domain feature graphs and the frequency-domain feature graphs of the different types of while-drilling parameters; taking time as a horizontal axis and sampling frequency and instantaneous energy changes of the different types of while-drilling parameters as a vertical axis, obtaining the time-frequency domain feature graphs of the different types of while-drilling parameters, and inputting the time-frequency domain image library of the different types of while-drilling parameters into the rock porosity convolutional neural network prediction model, namely a rock porosity convolutional neural network (VG-CNN) prediction model.

3. The rock porosity prediction method based on sample while-drilling data inversion according to claim 2, wherein in the step S4, a specific prediction process of the rock porosity convolutional neural network prediction model is as follows:

step 4.1: firstly, inputting the time-frequency domain feature graphs of the while-drilling information of the rocks with different porosities into a first convolutional layer of the VG-CNN prediction model, wherein the first convolutional layer consists of 42 convolution kernels with a size of 3×3;

step 4.2: next, inputting feature graphs from the first convolutional layer into a first pooling layer of the VG-CNN prediction model, wherein the first pooling layer consists of a 2×2 pooling window; and step 4.3: repeating the step 4.1 and the step 4.2 until a learning rate of the VG-CNN prediction model is ≤3×10$^{-5}$ and the decay coefficient is ≤1×10$^{-6}$, stopping model training, and substituting rock porosity prediction confusion matrix data into a following equation to verify a prediction accuracy A of the VG-CNN prediction model for rock porosity:

$$A = \frac{P_T + N_T}{P_T + N_T + P_F + N_F} (7),$$

wherein $P_T$ represents true positives, $N_T$ represents true negatives, $P_F$ represents false positives, and $N_F$ represents false negatives.

* * * * *